United States Patent [19]
Bellware

[11] 3,763,518
[45] Oct. 9, 1973

[54] WINDSHIELD WIPER APPARATUS
[75] Inventor: James D. Bellware, Dayton, Ohio
[73] Assignee: General Motors Corporation, Detroit, Mich.
[22] Filed: Apr. 17, 1972
[21] Appl. No.: 244,684

[52] U.S. Cl. .............................. 15/250.17, 74/599
[51] Int. Cl. .............................................. B60s 1/24
[58] Field of Search ................... 15/250.16, 250.17, 15/250.19; 74/75, 599, 600

[56] References Cited
UNITED STATES PATENTS

| | | | |
|---|---|---|---|
| 2,538,344 | 1/1951 | Wahlberg | 15/250.16 |
| 2,795,809 | 6/1957 | Vischulis, Jr. | 15/250.21 |
| 3,336,619 | 8/1967 | Hoyler | 15/250.14 |
| 3,688,333 | 9/1972 | Cimineo et al. | 15/250.16 |
| 3,716,887 | 2/1973 | Bellware | 15/250.17 |

Primary Examiner—Peter Feldman
Attorney—W. E. Finken et al.

[57] ABSTRACT

In a preferred form, this disclosure relates to a windshield wiping apparatus having a pair of oscillatable windingshield wipers, a pair of oscillatable drive pivots to which the wipers are drivingly connected, a yieldable support means for yieldably supporting a drive mechanism having a rotatable output shaft and a crank arm connected to the output shaft, and a drive transmission or linkage operatively connected with the crank arm and the drive pivots for oscillating the same to oscillate the wipers. The drive mechanism is operable to rotate the crank arm through a first orbit of a given radius during running operation and is operable to eccentrically move the rotatable output shaft to increase the throw of the crank arm to effect movement of the wipers from their inboard position toward a depressed park position when wiper operation is being terminated. The yieldable support means is operable to allow the crank arm to be held against rotation and the output shaft to be eccentrically shifted and trip a park switch upon the wipers encountering an obstruction which creates a back force in excess of a predetermined magnitude upon being moved from their inboard position toward their park position.

3 Claims, 8 Drawing Figures

PATENTED OCT 9 1973

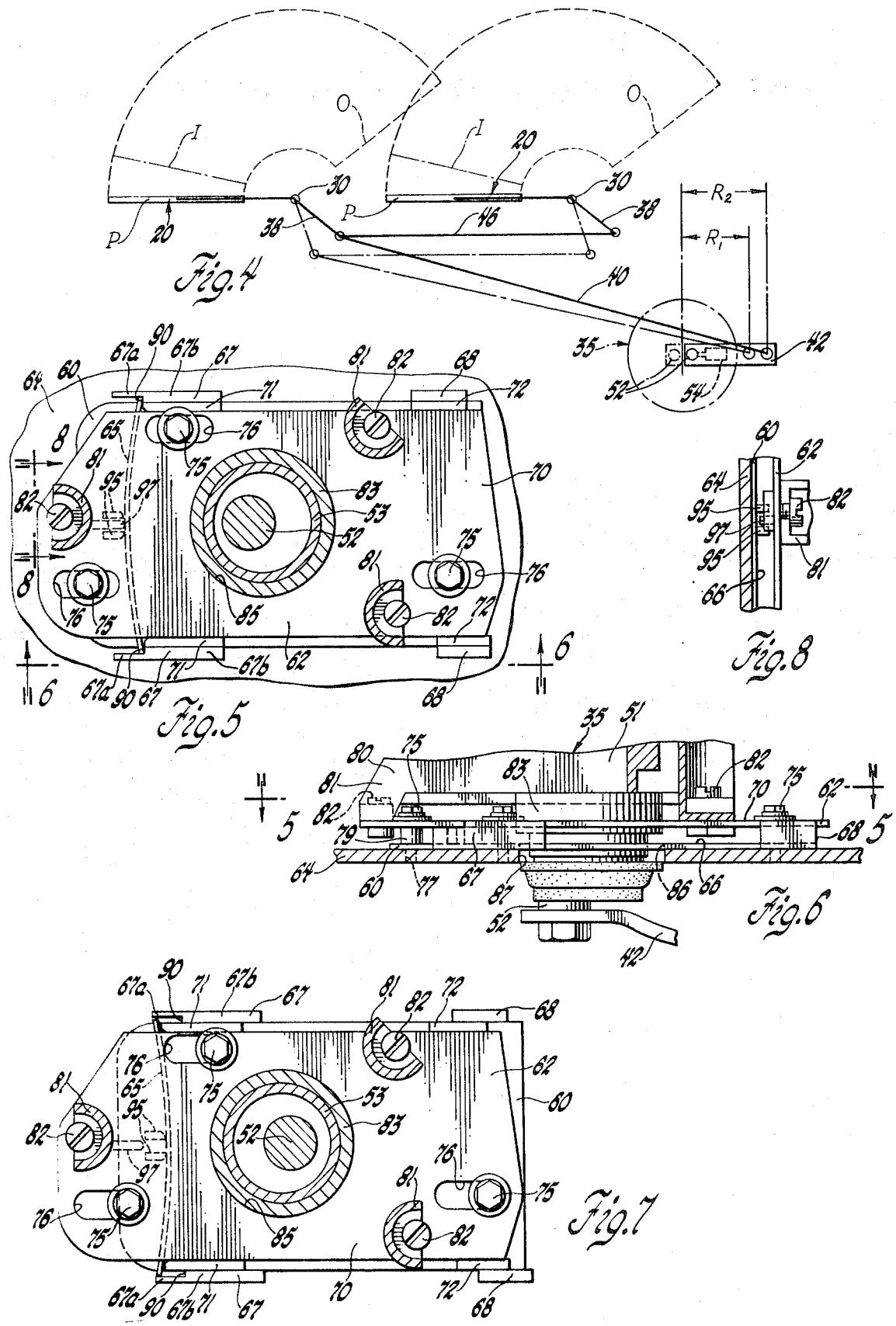

WINDSHIELD WIPER APPARATUS

The present invention broadly relates to a windshield wiping apparatus, and in particular to a windshield wiping apparatus having a pair of windshield wipers which are adapted to be oscillated across the outer surface of a windshield between inboard and outboard positions during running operation and which are adapted to be moved to a depressed park position adjacent the lower edge of the windshield when wiper operation is being terminated.

Depressed park windshield wiper systems usually include a pair of spaced drive pivots rotatably supported by the body structure of the vehicle and to which windshield wipers are mounted, a drive mechanism including a rotary output shaft and a crank arm attached to the output shaft, and a drive transmission or linkage connected with the drive pivots and the crank arm for reciprocating the windshield wipers between their inboard and outboard positions in response to rotation of the crank arm. The drive mechanism of such systems have also included a means for increasing the throw of the crank arm to effect movement of the wipers from their inboard position to a depressed park position adjacent the lower edge of the windshield when wiper operation is being terminated. Cam operated park switches are generally provided for de-energizing the drive mechanism upon the wipers reaching their depressed park position.

These known systems have also included means for de-energizing the wiper motor upon the wipers engaging an obstruction on the windshield which creates a back force in excess of a predetermined magnitude as the wipers are being moved from their inboard position toward their park position. These means have included such things as a yieldable link or linkage and slip clutches which respectively yield and slip to allow the motor to rotate until an associated park switch is opened, or thermal overload switches to effect de-energization of the motor when an excessive load is placed on the wiper system. For example, see U. S. Pat. Nos. 3,336,619, 2,538,344, 2,795,809 and 3,298,307.

In accordance with the provisions of the present invention, the drive mechanism is supported by a novel yieldable support means to accomplish the same end result. The yieldable support means is of a construction such that should the wipers encounter an obstruction upon their being moved from their inboard position toward their park position which creates a back force in excess of a predetermined magnitude, the support means will yield to allow the motor to continue to rotate and eccentrically shift the crank arm and trip a park switch to de-energize the motor without causing any damage to the windshield wiper system.

Accordingly, an important object of the present invention is to provide a new and improved depressed park windshield wiper system which includes yieldable support means for supporting a drive mechanism of the windshield wiper system and which is yieldable to allow the drive mechanism to continue to eccentrically shift its output shaft to trip a park switch to de-energize the wiper motor upon the wipers encountering a force in excess of a predetermined magnitude as they are being moved toward their park position.

Another object of the present invention is to provide a new and improved depressed park windshield wiper system as defined in the next preceding object, and wherein the yieldable support means comprises a stationary base which is adapted to be mounted on the vehicle, a support member for supporting the drive mechanism and which is slidably supported by the base for limited linear movement relative thereto and a spring means, preferably a leaf spring, in abutting engagement with the base and slidable member and which has a biasing force such that it prevents relative movement between the support member and the base during normal operation, but which is linearly movable relative to the base in opposition to the biasing force of the spring means upon the wipers encountering an obstruction which creates a back force on the wiper system in excess of a predetermined magnitude when the wipers are being moved toward their park position so as to enable the drive mechanism to continue to eccentrically shift the crank arm and trip a park switch to de-energize the wiper drive mechanism.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 4 is a schematic view of the windshield wiper apparatus of the present invention;

FIG. 5 is an enlarged sectional view taken approximately along line 5—5 of FIG. 6;

FIG. 6 is a sectional view taken approximately along line 6—6 of FIG. 3;

FIG. 7 is a view like that shown in FIG. 5 but showing different parts thereof in different positions; and FIG. 8 is a fragmentary sectional view taken approximately along line 8—8 of FIG. 5.

Figure 1:
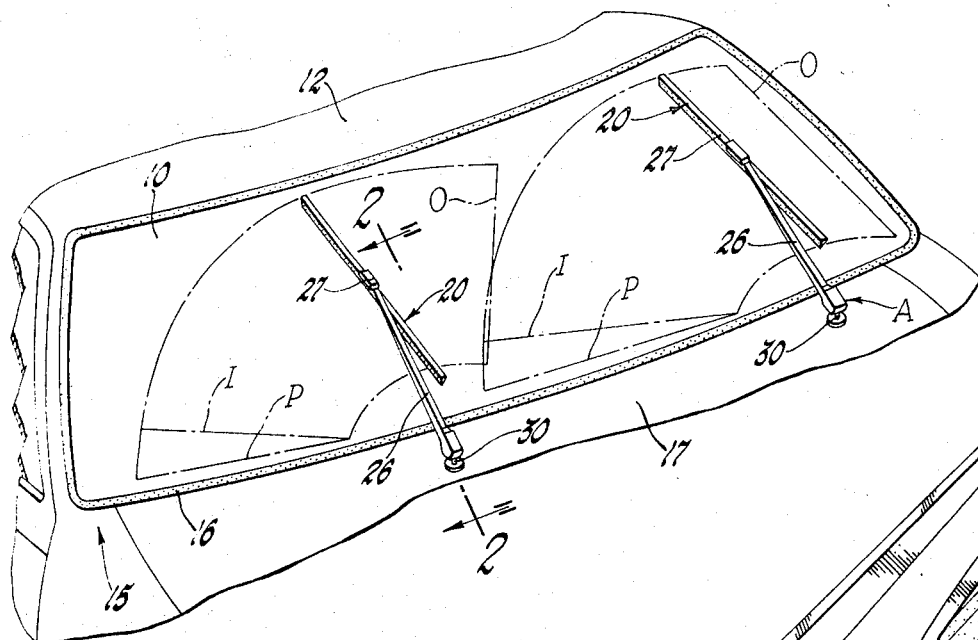
FIG. 1 is a fragmentary perspective view of an automotive vehicle embodying the novel windshield wiper apparatus of the present invention.
Figure 2:
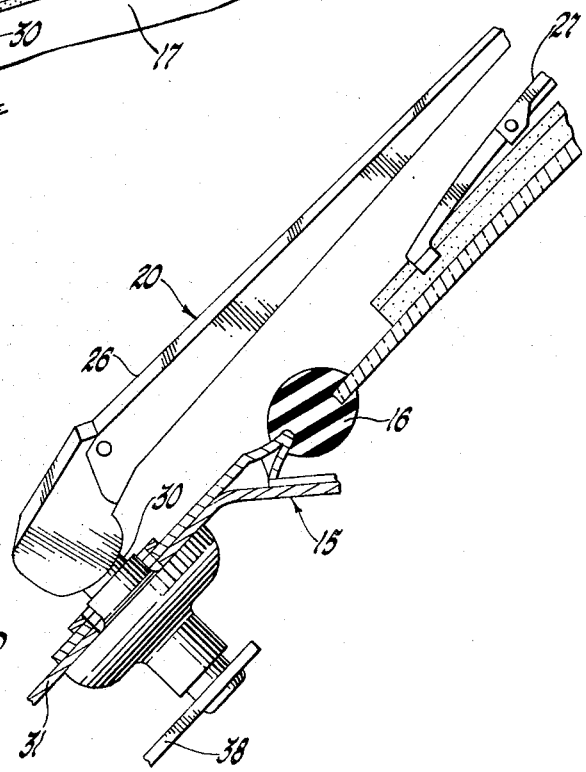
FIG. 2 is an enlarged fragmentary sectional view taken approximately along line 2—2 of FIG. 1.
Figure 3:
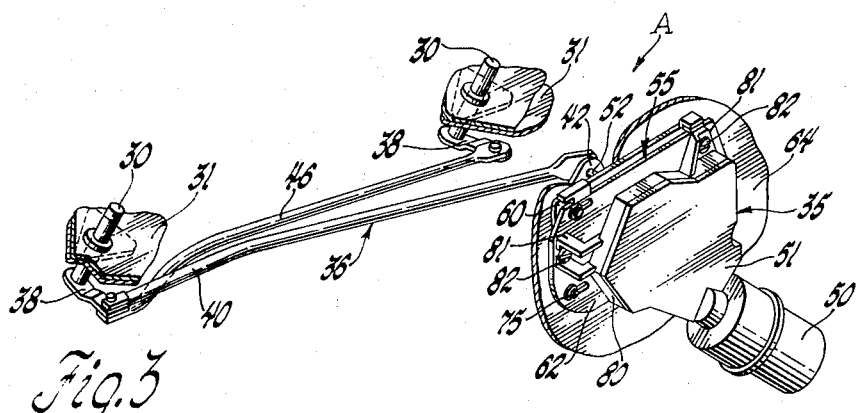
FIG. 3 is a fragmentary perspective view of part of the windshield wiper apparatus of the present invention.

The present invention provides a novel windshield wiper apparatus or system A for wiping a windshield 10 of an automotive vehicle 12. The windshield 10 is supported by suitable body structure 15 of the vehicle and is surrounded by reveal molding 16. Extending forwardly from the lower end of the windshield 10 is a cowl 17.

The windshield wiper system A includes a pair of spaced windshield wipers 20 which are adapted to be oscillated in tandem across the outer surface of the windshield 10 between inboard and outboard positions, designated by the letters I and O respectively, during running operation of the wipers 20 and to a depressed park position P adjacent the reveal molding 16 at the lower edge of the windshield 10 when wiper operation is being terminated. It should be noted at this point that the present invention is equally usable with a slot concealed, depressed park windshield wiper system in which the rearward edge of the hood or cowl is spaced forwardly from the windshield to provide an elongated slot extending transversely of the windshield 10. In this latter system the windshield wipers when in their park position P would be located within the slot so as to be concealed from view.

The windshield wipers 20 include a wiper arm 26 having spring hinged connected inner and outer wiper arm sections for urging a wiper blade assembly 27 into engagement with the outer surface of the windshield 10. The inner end section of the windshield wiper arms 26 are suitably secured to rotatable drive pivots 30 rotatably supported by support means 31 secured to the body structure 15 of the vehicle 12.

The drive pivots 30 are adapted to be rotated to oscillate the wipers between their inboard and outboard positions I and O during running operation by a drive mechanism 35 which is operatively connected therewith via a drive transmission or linkage arrangement 36. The drive transmission 36 comprises a pair of crank arms 38 having one end drivingly connected to the drive pivots 30, a drive link 40 having one end connected via a ball and socket joint to a crank arm 42 of the drive mechanism 35 and its other end connected to the leftmost crank arm 38 and a cross or follower link 46 having one end connected via a ball and socket joint to the leftmost crank arm 38 and its other end connected via a ball and socket joint to the rightmost crank arm 38.

The drive mechanism 35 comprises an electric motor 50 and gear reduction unit 51 having an output shaft 52 which is drivingly connected to one end of the crank arm 42. The drive mechanism 35 could be of any suitable or conventional construction in which the throw of the crank arm is increased to move the wipers 20 to a depressed park position P when wiper operation is being terminated. Since the drive mechanism 35 does not, per se, perform a part of the present invention, it will not be described in detail. Suffice it to say that it is preferably of the type shown and described in U. S. Pat. No. 3,253,206, and assigned to the same assignee as the present invention. In the drive mechanism of the aforementioned patent, the output shaft 52 is coupled to a rotatable drive sleeve 53 of the gear reduction unit 51 to rotate the crank arm 42 through a given radius $R_1$ during running operation (see FIG. 4). When wiper operation is being terminated and the wipers reach their inboard position I, the output shaft is uncoupled from the rotatable drive sleeve of the gear reduction unit 51 and eccentrically moved or shifted relative to the rotatable drive sleeve 53 to increase the radius or throw of the crank arm 42 to radius $R_2$ to move the wipers from their inboard position I to their park position P. During this eccentric shifting of the output shaft 52, the crank arm 42 more or less remains in the disposition shown in FIG. 4 and when shifted to increase the radius of the crank arm to $R_2$ causes a conventional park switch 54, shown schematically in FIG. 4, to be opened or tripped to de-energize the wiper motor 50.

When wiper operation is initiated the crank arm 42 is eccentrically moved to decrease the radius or throw of the crank arm 42 from radius $R_2$ to radius $R_1$ to effect movement of the wipers from their park position P to their inboard position I and then the output shaft 52 is coupled to the rotatable drive sleeve of the gear reduction unit 51 to rotate the output shaft thereiwth and effect rotation of the crank arm about the radius $R_1$ during running operation to move the wipers between their inboard and outboard positions I and O.

In accordance with the provisions of the present invention, a novel yieldable support means 55 for supporting the drive mechanism 35 is provided. The yieldable support means 55 is constructed and arranged such that it will yield when a back force on the wiper system exceeds a predetermined magnitude due to the wipers 20 encountering an obstruction as they are being moved from their inboard position toward their park position so as to allow the drive mechanism 35 as a unit to move to allow the output shaft 52 to continue to be eccentrically shifted unitl it trips the park switch 54.

The yieldable support means 55 broadly comprises a stationary base 60, a support member or plate 62 slidably supported by the base 60 for a limited linear movement relative thereto and to which the drive mechanism 35 is mounted and a spring means 65 for biasing the support plate 62 to a normal position relative to the base 60.

The base member 60 is generally rectangular in shape and has a flat bottom 66 which is positioned against a support or firewall 64 of the vehicle, a pair of upstanding side wall portions 67 adjacent its left end, as viewed in FIG. 5 and a pair of upstanding side wall portions 68 adjacent its right end, as viewed in FIG. 5. The support plate 62 is generally rectangular in shape and includes a planar top wall 70, a pair of downwardly extending side wall portions 71 adjacent its left end, as viewed in FIG. 5, and a pair of downwardly extending side wall portions 72 adjacent its right end, as viewed in FIG. 5. The side wall portions 71 and 72 of the support plate 62 slidably engage the side wall portions 67 and 68 of the base and the latter side wall portions serve to guide the support plate 62 for linear movement relative to the base in a generally horizontal path laterally of the vehicle 12. The base 60 is secured to the firewall 64 by three screws or bolts 75 which extend through elongated slots 76 in the support plate 62 and which threadably engage threaded openings 77 in the firewall 64. Annular spacers 79 surrounding the bolts 75 and disposed between the bottom 66 of the base 60 and the top 70 of the support plate 62 serve to support the support plate 62 on the base 60.

The gear reduction unit 51 is housed in a housing 80 having three depending legs 81 which are suitably bolted to the support plate 62 via screws 82. As best shown in FIG. 6, the gear reduction unit 51 has a downwardly extending hub portion 83 which extends through aligned openings 85, 86, and 87 in the support plate 62, base 60 and firewall 64, respectively The openings 86 and 87 in the base 60 and firewall 64 are oversize so as to enable the support plate 62 and the drive mechanism 35 to move relative to the base 60 and firewall 64.

The support plate 62 is biased toward a normal position with respect to the base 60, as shown in FIG. 5, by the spring means 65. The spring means 65 comprises a leaf spring whose outer ends are in abutting engagement with shoulders 90 formed at the juncture between thin and thick wall portions 67a and 67b of the side wall portions 67 on the base 60. The leaf spring 65 adjacent its midpoint also abuttingly engages a pair of abutments 95 which are welded on the bottom 66 of the base and extend transversely of the base 60. The leaf spring at its midpoint is also in abutting engagement with an abutment 97 welded to the underside of the top 70 of the support plate and which extends transversely thereof toward the bottom 66 of the base 60. The abutment 97 is disposed between the abutments 95 on the base 60. When the leaf spring 65 is in the position shown in FIG. 5, it is stressed or deflected from its normal free state condition and serves to bias the support plate 62 to the position whown in FIG. 5, and in which the screws 75 are located intermediate the slots 76. The biasing force of the leaf spring 65 is such that during normal wiper operation, no movement of the support plate 62 relative to the base 60 takes place. Movement of the support plate 62 to the left relative to the base 60 is prevented during normal operation as a result of the engagement between the side wall portions 71 on the support plate 61 and the ends of the spring 65. Movement to the right is prevented during normal operation as a result of the engagement between the abutment 97 and the spring 65.

Referring to the schematic view in FIG. 4, it can be seen that as the wipers 20 are moved from their inboard position I toward their park position P the crank arm 42 and the drive transmission 36 are moved from their phantom line position toward their solid line position. If one or both of the wipers 20 were to encounter an obstruction upon being moved from their inboard position I toward their park position P such that further movement of the wipers 20 cannot take place and hence, the drive link 40 cannot be moved toward the right, the support plate 62 will be moved toward the left toward a position such as that shown in FIG. 7 to allow the crank arm 42 to continue to be eccentrically moved toward its solid line position shown in FIG. 4 in which it will trip the park switch 54 to de-energize the wiper motor. As the support plate 62 is moved toward the left, the side wall portions 71 thereof will engage the ends of the leaf spring 65 to cause the latter to be deflected about the stationary abutments 95 toward the position shown in FIG. 7. The yieldable support means 55 thus in effect allows the drive shaft 52 to be eccentrically shifted laterally of the vehicle 12 to allow the crank arm throw to be increased to trip the park switch 54.

Likewise, should an obstruction be encountered by the wipers as they are being moved from their park position P toward their inboard position I upon initiation of wiper operation, the support plate 62 will be caused to be shifted relative to the base 60 toward the right, to allow the radius of the crank arm to be reduced from radius $R_2$ toward radius $R_1$. This movement may be sufficient to enable the wipers 20 to move or break loose from the obstruction and, if not, the conventional overload circuit breaker (not shown) within the wiper motor 50 would open to de-energize the motor 50 if the obstruction continued to exist. During the movement of the support 62 to the right relative to the base 60, the abutment 97 would engage the middle of the leaf spring 65 to cause the same to be deflected toward the right while remaining in engagement with the stationary side walls 67.

From the foregoing, it should be apparent that the yieldable support means 55 will prevent damage to the windshield wiper system in the event that an obstruction is encountered by the wipers which prevent further movement thereof as they are being moved toward or from their park position.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. In a windshield wiping apparatus for an automotive vehicle comprising a pair of windshield wipers which are adapted to be oscillated across the windshield between inboard and outboard positions during running operation and moved to a depressed park position spaced from the inboard position when wiper operation is being terminated, a pair of oscillatable drive pivots to which the wipers are drivingly connected, a drive mechanism having a rotatable output shaft and a crank arm connected with said output shaft, a drive transmission operatively connected to said crank arm and said drive pivots for oscillating said wipers in response to said drive mechanism rotating said crank arm, said drive mechanism being operable to rotate said crank arm through a first orbit of a given radius during running operation and being operable to increase the throw of the crank arm to effect movement of the wipers from their inboard position towards their park position when wiper operation is being terminated, said drive mechanism including a park switch operatively associated therewith for effecting de-energization of the drive mechanism when the latter has moved the wipers to their park position, the improvement comprising: a yieldable support means for supporting said drive mechanism, said support means having a base which is adapted to be supported by the vehicle, a support member for supporting the drive mechanism and which is slidably supported by said base for limited linear movement relative thereto and a spring means for biasing said support member toward a normal position relative to said base member, said spring means having one portion thereof in abutting engagement with said base and another portion thereof in abutting engagement with said support member and having a biasing force such that it prevents relative movement between the support plate and the base during normal operation of the wipers, said support plate and drive mechanism being linearly movable as a unit relative to said base and in opposition to the biasing force of said spring means upon said wipers encountering an obstruction which creates a back force on the wiper apparatus in excess of a predetermined magnitude when the wipers are being moved from their inboard position to their park position so as to enable the drive mechanism to continue to increase the thorw of the crank arm and trip the park switch to de-energize the drive mechanism.

2. In an automotive vehicle having a windshield supported by body structure and a windshield wiping apparatus including a pair of windshield wipers which are adapted to be oscillated across the windshield between inboard and outboard positions during running operation and which are adapted to be moved to a depressed park position located beneath the inboard position when wiper operation is being terminated, a pair of oscillatable spaced drive pivots to which the wipers are drivingly connected, a drive mechanism having a rotatable output shaft and a crank arm connected with said output shaft, a drive transmission operatively connected with said crank arm and said drive pivots for oscillating said drive pivot to oscillate the wipers in response to said drive mechanism rotating said crank arm, said drive mechanism being operable to rotate said output shaft and said crank arm through a first orbit of a given radius during running operation and being operable to interrupt the driving connection therebetween and eccentrically move the output shaft to increase the throw of the crank arm to effect movement of the wipers from their inboard position toward their park position upon the wipers reaching their inboard position when wiper operation is being terminated, the improvement comprising: a yieldable support means for supporting said drive mechanism, said support means having a base which is adapted to be supported by the body structure of the vehicle, a support member connected to the drive mechanism and which is slidably supported by said base for linear limited movement relative thereto and a spring means for biasing said support member toward a normal position relative to said base member, said base being secured to said body structure by fasteners which extend through elongated slots in said support member and said support member being slidable on annular spacers disposed between said base and support member and surrounding said fasteners, said spring means comprising a leaf spring having its opposite end portions in abutting engagement with said base and said support member and intermediate portions in abutting engagement with abutments extending laterally of said base and said support member, said spring means having a biasing force such that it prevents relative movement between the support plate and the base during normal operation of the wipers, said support plate and drive mechanism being linearly movable as a unit relative to said base and in opposition to the biasing force of said leaf spring upon said wipers encountering an obstruction which creates a back force on the wiper system in excess of a predetermined magnitude when being moved from their inboard position to their park position so as to enable the drive mechanism to increase the throw of the crank arm and trip the park switch and de-energize the drive mechanism.

3. In an automotive vehicle having a windshield supported by body structure and a windshield wiping apparatus including a pair of windshield wipers which are adapted to be oscillated across the windshield between inboard and outboard positions during running operation and which are adapted to be moved to a depressed park position located beneath the inboard position when wiper operation is being terminated, a pair of oscillatable spaced drive pivots to which the wipers are drivingly connected, a drive mechanism having a rotatable output shaft and a crank arm connected with said output shaft, a drive transmission operatively connected with said crank arm and said drive pivots for oscillating said drive pivot to oscillate the wipers in response to said drive mechanism rotating said crank arm, said drive mechanism being operable to rotate said output shaft and said crank arm through a first orbit of a given radius during running operation and being operable to interrupt the driving connection therebetween and eccentrically move the output shaft to increase the throw of the crank arm to effect movement of the wipers from their inboard position toward their park position upon the wipers reaching their inboard position when wiper operation is being terminated, the improvement comprising: a yieldable support means for supporting said drive mechanism, said support means having a base which is adapted to be supported by the body structure of the vehicle, a support member slidably supported by said base for linear limited movement relative thereto and a spring means for biasing said support member toward a normal position relative to said base member, said drive mechanism being mounted on said support member, said base having upstanding side portions which slidably engage depending side portions of said support member to guide the same for linear movement relative to the base, said spring means comprising a leaf spring having its opposite end portions in abutting engagement with said base and said support member and intermediate portions in abutting engagement with abutments extending laterally of said base and said support member, said spring means having a biasing force such that it prevents relative movement between the support plate and the base during normal operation of the wipers, said support plate and drive mechanism being linearly movable as a unit relative to said base and in opposition to the biasing force of said leaf spring upon said wipers encountering an obstruction which creates a back force on the wiper system in excess of a predetermined magnitude when being moved from their inboard position to their park position so as to enable the drive mechanism to increase the throw of the crank arm and trip the park switch and de-energize the drive mechanism.

* * * * *